United States Patent
Komiyama et al.

(10) Patent No.: US 10,938,480 B2
(45) Date of Patent: Mar. 2, 2021

(54) ELECTRONIC APPARATUS HAVING MULTIPLE TRANSCEIVERS

(71) Applicant: LENOVO (SINGAPORE) PTE. LTD., Singapore (SG)

(72) Inventors: Hirohide Komiyama, Kanagawa (JP); Masayuki Amano, Kanagawa (JP); Tabito Miyamoto, Kanagawa (JP); Masato Itoh, Kanagawa (JP)

(73) Assignee: LENOVO (SINGAPORE) PTE LTD, Singapore (SG)

( * ) Notice: Subject to any disclaimer, the term of this patent is extended or adjusted under 35 U.S.C. 154(b) by 0 days.

(21) Appl. No.: 16/586,337

(22) Filed: Sep. 27, 2019

(65) Prior Publication Data
US 2020/0106525 A1 Apr. 2, 2020

(30) Foreign Application Priority Data
Sep. 27, 2018 (JP) .............................. JP2018-181372

(51) Int. Cl.
*H04J 14/00* (2006.01)
*H04B 10/40* (2013.01)
*H04L 5/14* (2006.01)

(52) U.S. Cl.
CPC .............. *H04B 10/40* (2013.01); *H04L 5/14* (2013.01)

(58) Field of Classification Search
CPC .................................. H04B 10/40; H04L 5/14
See application file for complete search history.

(56) References Cited

U.S. PATENT DOCUMENTS

| | | | | |
|---|---|---|---|---|
| 5,706,114 A | * | 1/1998 | Erteza | H04B 10/11 359/15 |
| 2001/0043381 A1 | * | 11/2001 | Green | H04B 10/1123 398/126 |
| 2002/0003640 A1 | * | 1/2002 | Trezza | H04B 10/2725 398/161 |
| 2003/0063863 A1 | * | 4/2003 | Nardelli | G02B 6/43 385/53 |
| 2007/0177879 A1 | * | 8/2007 | Hsieh | H04B 10/40 398/151 |
| 2010/0296820 A1 | * | 11/2010 | Kuo | H04B 10/803 398/201 |
| 2011/0058817 A1 | * | 3/2011 | Kuo | H04B 10/803 398/130 |

FOREIGN PATENT DOCUMENTS

| | | |
|---|---|---|
| JP | 08274717 A | 10/1996 |
| JP | 2000010658 A | 1/2000 |
| JP | 2002091622 A | 3/2002 |
| JP | 2005182393 A | 7/2005 |

* cited by examiner

*Primary Examiner* — David C Payne
*Assistant Examiner* — Pranesh K Barua
(74) *Attorney, Agent, or Firm* — Antony P. Ng; Russell Ng PLLC (57) ABSTRACT

A transceiver is disclosed. The transceiver includes a first unit capable of a full-duplex communication using an electromagnetic wave, and a second unit capable of a full-duplex communication using an electromagnetic wave. The first unit includes a transmitter and a receiver arranged in this order at a predetermined interval in a first direction. The second unit includes a receiver and a transmitter arranged in this order at a predetermined interval in the first direction. The second unit is placed adjacent to the first unit in a second direction perpendicular to the first direction.

8 Claims, 6 Drawing Sheets

ELECTRONIC APPARATUS HAVING MULTIPLE TRANSCEIVERS

PRIORITY CLAIM

The present application claims benefit of priority under 35 U.S.C. §§ 120, 365 to the previously filed Japanese Patent Application No. JP2018-181372 with a priority date of Sep. 27, 2018, which is incorporated by reference herein.

TECHNICAL FIELD

The present invention relates to electronic apparatuses in general, and in particular to an electronic apparatus that allows for a reduced installation space even when multiple transceivers are placed adjacent to each other in the electronic apparatus and an extension device.

BACKGROUND

A portable information apparatus, such as a notebook type personal computer (Laptop PC) or a tablet type personal computer (tablet PC), is often provided with only a small number of connectors for peripheral devices. This is because such a PC tend to place a high importance on portability, and thus having a small main body. Accordingly, an extension device such as a port replicator or a docking station may supplementarily be used. A port replicator is a mass of adapters to be attached to the rear of the main body of a Laptop PC, for example. Generally, when a user goes out with a Laptop PC, the port replicator is detached from the Laptop PC. A combined use of a Laptop PC and a port replicator makes it possible to provide a satisfactory use environment when the Laptop PC is used as a stationary PC. At the same time, an elimination of less frequently used connectors from the main body of the Laptop PC improves the portability thereof. A docking station has various extension functions in addition to the function of a port replicator.

When an extension device is connected to a Laptop PC, a full-duplex communication may be performed to obtain a high transmission rate or transfer rate. This is achieved by an optical coupling of the mutually opposing optical transceivers in the extension device and the Laptop PC. Also, two or more sets of such opposing optical transceivers may be placed in parallel so that a higher transmission rate is obtained than that obtained by a set of opposing optical transceivers. For example, when a set of opposing optical transceivers provides a transmission rate of 20 Gbps, a transmission rate of 40 Gbps is provided by placing two sets of opposing optical transceivers in parallel.

However, the parallel placement of two sets of opposing optical transceivers causes interference therebetween. That is, a light beam transmitted from an optical transmitter is received not only by an opposing optical receiver but also by another optical receiver placed adjacent thereto. As such, these adjacent optical transceivers are required to be placed apart from each other so that they are prevented from mutually interfering, which results in a greater installation space.

Consequently, it would be desirable to provide an electronic apparatus that allows a reduced installation space even when multiple transceivers are placed adjacent to each other in the electronic apparatus and an extension device.

SUMMARY

In accordance with an embodiment of the present disclosure, a transceiver includes a first unit capable of a full-duplex communication using an electromagnetic wave, wherein the first unit includes a transmitter and a receiver arranged in this order at a predetermined interval in a first direction; and a second unit capable of a full-duplex communication using an electromagnetic wave, wherein the second unit includes a receiver and a transmitter arranged in this order at a predetermined interval in the first direction. The second unit is placed adjacent to the first unit in a second direction perpendicular to the first direction.

All features and advantages of the present disclosure will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

I. Laptop PC and Extension Device

Figure 1:
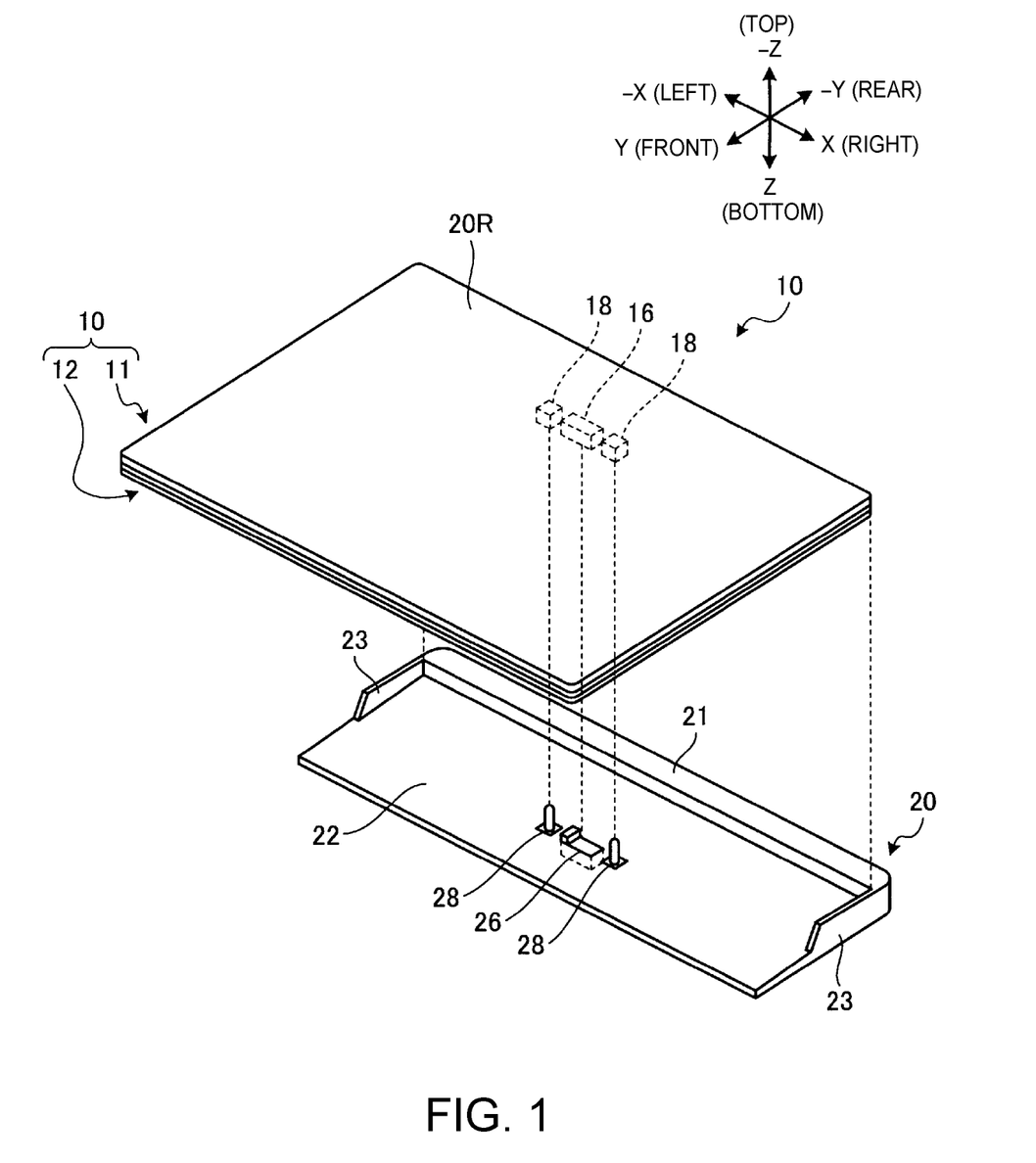
FIG. 1 is a perspective view showing a relationship between a Laptop PC and an extension device before the extension device is connected to the Laptop PC.

FIG. 1 is a perspective view showing a relationship between a Laptop PC 10 and an extension device 20 before the extension device 20, which is an electronic apparatus, is connected to the Laptop PC 10, which is another electronic apparatus. As shown in FIG. 1, the Laptop PC is configured such that a display chassis 11 is rotatable relative to a main body chassis 12 through a hinge provided at a rear edge (an edge in a −Y direction) of the main body chassis 12. FIG. 1 shows a state in which the display chassis 11 is overlapped on the main body chassis 12.

The main body chassis 12 has a keyboard device, a touch pad or the like provided on its top surface and houses a printed circuit board (a motherboard, not shown) on which a plurality of electronic components such as a CPU and a memory are mounted. The display chassis 11 has a liquid crystal display or the like provided on its lower surface.

The extension device 20 is a port replicator and houses a printed circuit board (not shown) on which a set of electronic components are mounted to extend a function of the Laptop PC 10. The extension device 20 has various types of communication connection parts, e.g., a wired connector such as a USB connector and a terminal for a wireless communication connection including a short-distance radio communication. The Laptop PC and the extension device 20 can be connected at least by a communication coupling via optical transceivers opposing to each other.

The Laptop PC 10 has, at its rear end 20R, a pair of hook receiving parts 18 and an optical transceiver section 16 on the lower surface of the main body chassis 12. Meanwhile, the extension device 20 has a pair of hooks 28 and an optical transceiver section 26 on its top surface.

The Laptop PC 10 is positioned relative to the extension device 20 by: inserting the rear end 20R obliquely between a pair of guide parts 23 provided on the extension device 20 from a front side thereof; sliding the rear end 20R on a slide surface 22 to abut a rear protrusion 21; lowering the Laptop PC 10; and inserting the hooks 28 into the hook receiving parts 18. The optical transceiver section 16 and the optical transceiver section 26 are then in a positional relationship in which they can be optically coupled. Note that the optical coupling shown in FIG. 1 is merely an example, and the location and the position are not exclusive.

II. Optical Transceiver Section

Figure 2:
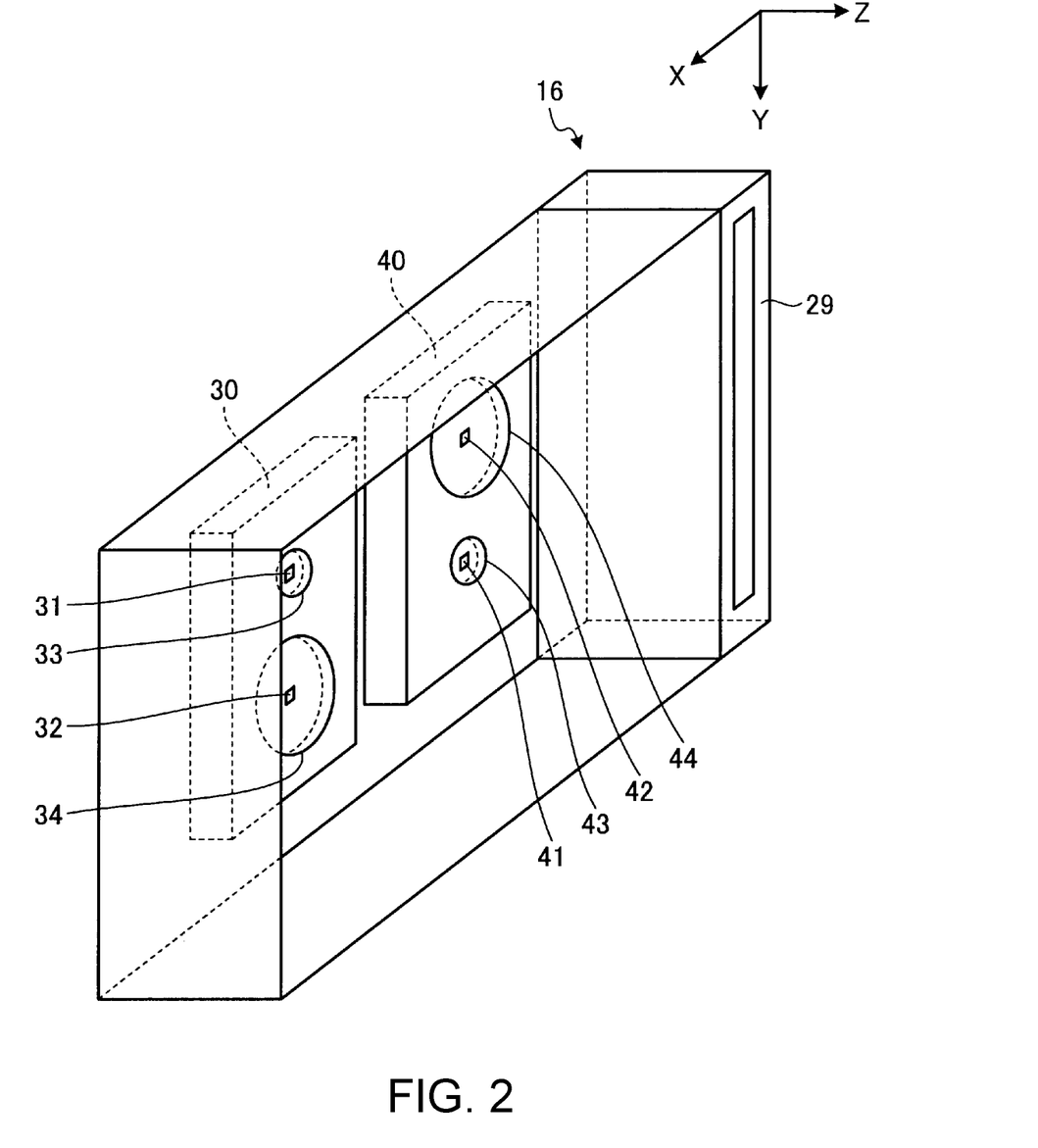
FIG. 2 is a perspective view showing a structure of an optical transceiver section on the Laptop PC.

FIG. 2 is a perspective view showing a structure of the optical transceiver section 16 on the Laptop PC 10. As shown in FIG. 2, the optical transceiver section 16 includes optical transceivers 30 and 40 that are placed in parallel in an X direction (right-left direction). At an end of the optical transceiver 40 in a −X direction, a power connector 29 is provided.

The optical transceiver 30 has an optical transmitter 31 such as a surface emission laser and an optical receiver 32 such as a photodiode. A light generated by the optical transmitter 31 is emitted through a collimator lens 33. A light toward the optical receiver 32 is input through a condenser lens 34. Likewise, the optical transceiver 40 has an optical transmitter 41 and a collimator lens 43 as well as an optical receiver 42 and a condenser lens 44.

Each of the optical transceivers 30, 40 includes components such as a laser driving circuit and a transimpedance amplifier: the laser driving circuit drives a light beam which is launched from the optical transmitter 31, 41, and the transimpedance amplifier amplifies a current photoconverted by a photodiode, which is the optical receiver 32, 42, into a voltage signal.

The optical transceivers 30, 40 are identical modules. A line between the optical transmitter 31 and the optical receiver 32 forming a pair and a line between the optical transmitter 41 and the optical receiver 42 forming a pair both run in a front-rear direction (Y direction), and the optical transceiver 30 and the optical transceiver 40 are placed adjacent to each other in the X direction (right-left direction) perpendicular to the Y direction. The positional relationship between the optical transmitter 31 and the optical receiver 32 in the Y direction is opposite to that between the optical transmitter 41 and the optical receiver 42 in the Y direction. Specifically, the optical transmitter 31 is located at a −Y direction side of (i.e., in the rearward of) the optical receiver 32, and the optical transmitter 41 is located at a +Y direction side of (i.e., in front of) the optical receiver 42.

The optical transceiver section 16 is preferably filled with a protective material except in the area concerned with a light transmission from the optical transmitters 31, 41 and to the optical receivers 32, 42.

III. Placement of Optical Transceivers

Figure 3:
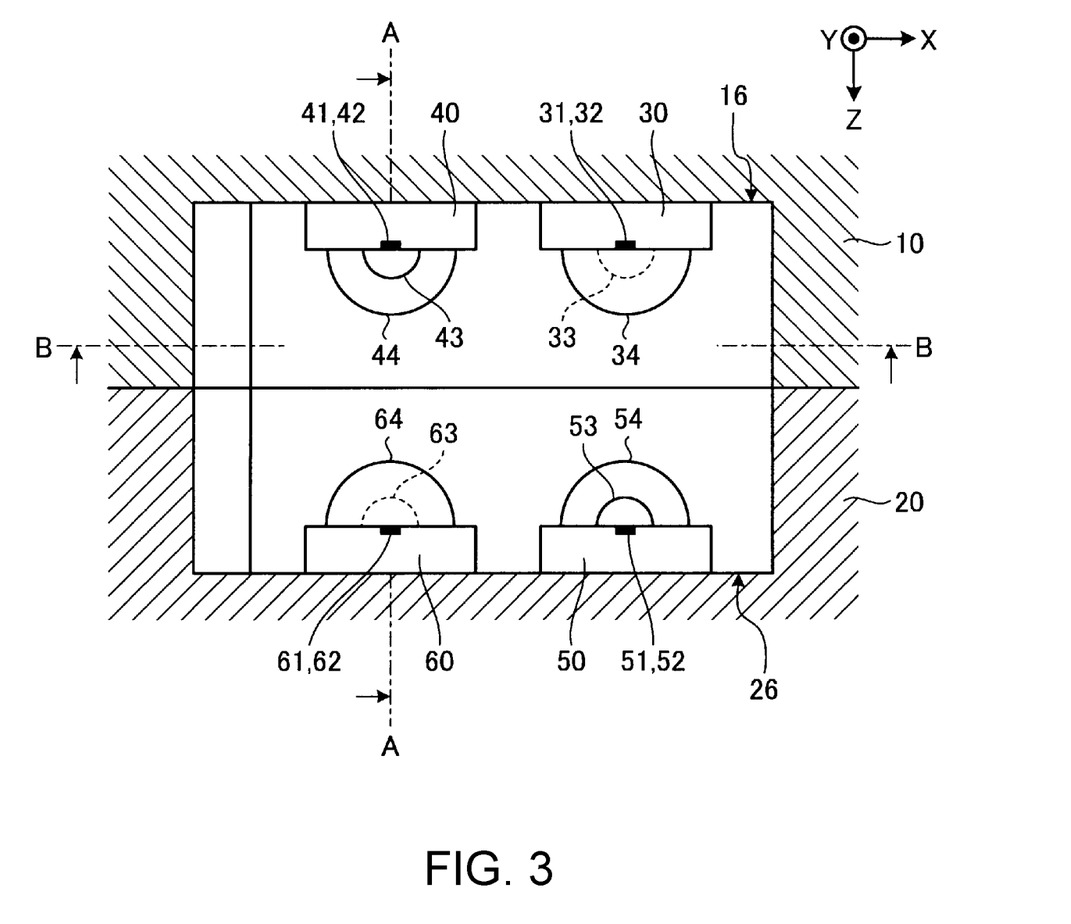
FIG. 3 is a sectional view showing a coupled state of optical transceivers on the Laptop PC and optical transceivers on the extension device.
Figure 4:
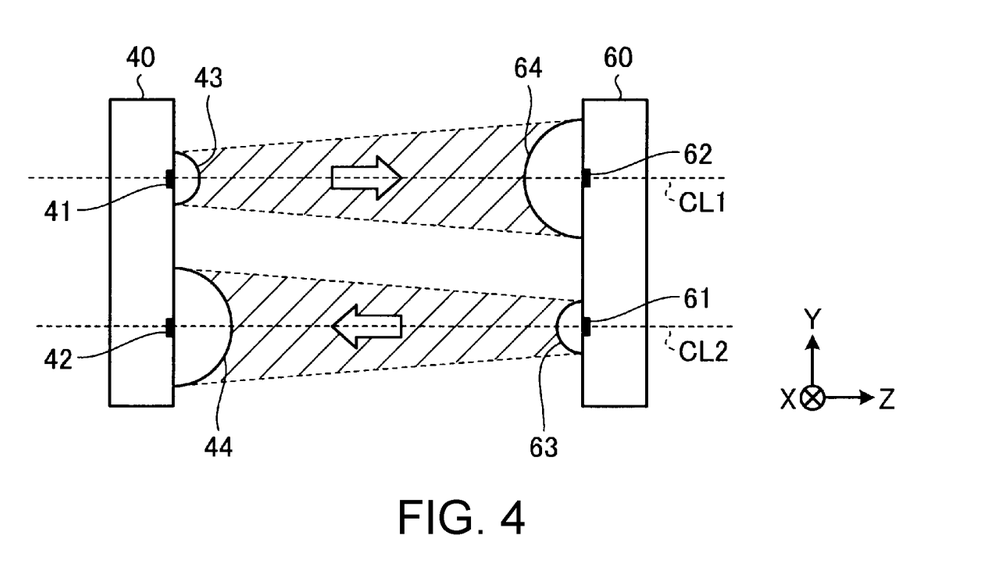
FIG. 4 is a sectional view taken along line A-A of FIG. 3, showing the coupled state of the optical transceivers on the Laptop PC and the optical transceivers on the extension device.
Figure 5:
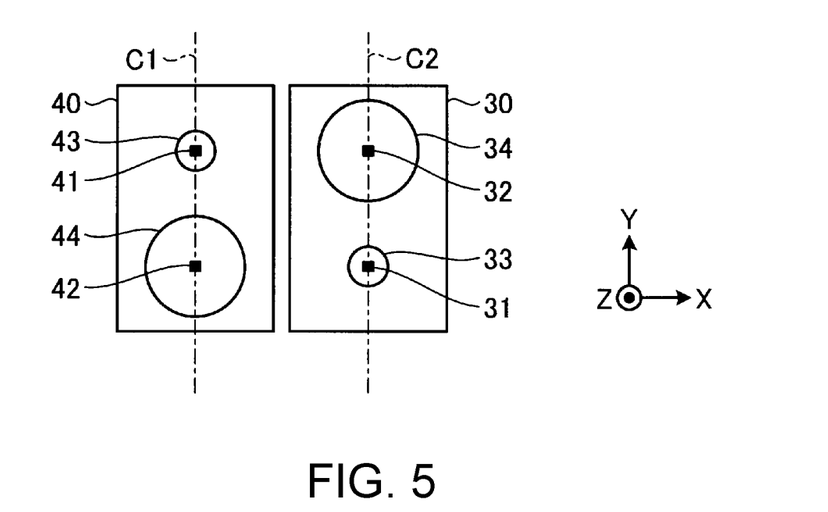
FIG. 5 is a sectional view taken along line B-B of FIG. 3, showing the coupled state of the optical transceivers on the Laptop PC and the optical transceivers on the extension device.

FIG. 3 is a sectional view showing a coupled state of the optical transceivers 30, 40 on the Laptop PC 10 and optical transceivers 50, 60 on the extension device 20. FIG. 4 is a sectional view taken along line A-A of FIG. 3 and shows the coupled state of the optical transceivers 30, 40 on the Laptop PC 10 and the optical transceivers 50, 60 on the extension device 20. FIG. 5 is a sectional view taken along line B-B of FIG. 3 and shows the coupled state of the optical transceivers 30, 40 on the Laptop PC 10 and the optical transceivers 50, 60 on the extension device 20. The optical transceivers 30, 40, 50 and 60 are all modules having identical structures.

As shown in FIGS. 3-5, the optical transceivers 30, 40 on the Laptop PC 10 are placed in the X direction so that they oppose to the optical transceivers 50, 60 on the extension device 20 as a whole. The optical transceiver 50 includes an optical transmitter 51, an optical receiver 52, a collimator lens 53 and a condenser lens 54. The optical transceiver 60 includes an optical transmitter 61, an optical receiver 62, a collimator lens 63 and a condenser lens 64. The optical transmitter 31 and the optical receiver 52, the optical transmitter 51 and the optical receiver 32, the optical transmitter 41 and the optical receiver 62, and the optical transmitter 61 and the optical receiver 42 are respectively disposed to be opposed to each other in a Z direction. For example, as shown in FIG. 4, the optical transmitter 41 and the optical receiver 62 are disposed on a line CL1 which passes through the optical transmitter 41 and the optical receiver 62 and is parallel to the Z direction. Likewise, the optical transmitter 61 and the optical receiver 42 are disposed on a line CL2 which passes through the optical transmitter 61 and the optical receiver 42 and is parallel to the Z direction.

The optical transmitter 31 and the optical receiver 32, the optical transmitter 41 and the optical receiver 42, the optical transmitter 51 and the optical receiver 52, and the optical transmitter 61 and the optical receiver 62 are respectively arranged in the Y direction. For example, as shown in FIG. 5, the optical transmitter 31 and the optical receiver 32 are arranged on a line C2 which passes through the optical transmitter 31 and the optical receiver 32 and is parallel to the Y direction. Likewise, the optical transmitter 41 and the optical receiver 42 are arranged on a line C1 which passes through the optical transmitter 41 and the optical receiver 42 and is parallel to the Y direction. The optical transceiver 30 and the optical transceiver 40 are placed adjacent to each other in the X direction. In the same manner, the optical transceivers 50, 60 are placed adjacent to each other in the X direction. Here, in the optical transceiver 30 as a first unit, the optical transmitter 31 and the optical receiver 32 are arranged in this order at a predetermined interval in a first direction (+Y direction). In the optical transceiver 40 as a second unit, the optical receiver 42 and the optical transmitter 41 are arranged in this order at a predetermined interval in the first direction (+Y direction). The optical transceiver 30 and the optical transceiver 40 are placed adjacent to each other in a second direction (X direction).

As shown in FIG. 4, a full-duplex communication is performed between the optical transceiver 40 and the optical transceiver 60: a light beam from the optical transmitter 41, which contains a transmission signal and passes through the collimator lens 43 and the condenser lens 64, enters the optical receiver 62, and a light beam from the optical transmitter 61, which contains a transmission signal and passes through the collimator lens 63 and the condenser lens 44, enters the optical receiver 42. A full-duplex communication is performed between the optical transceiver 30 and the optical transceiver 50 as well.

Figure 6:
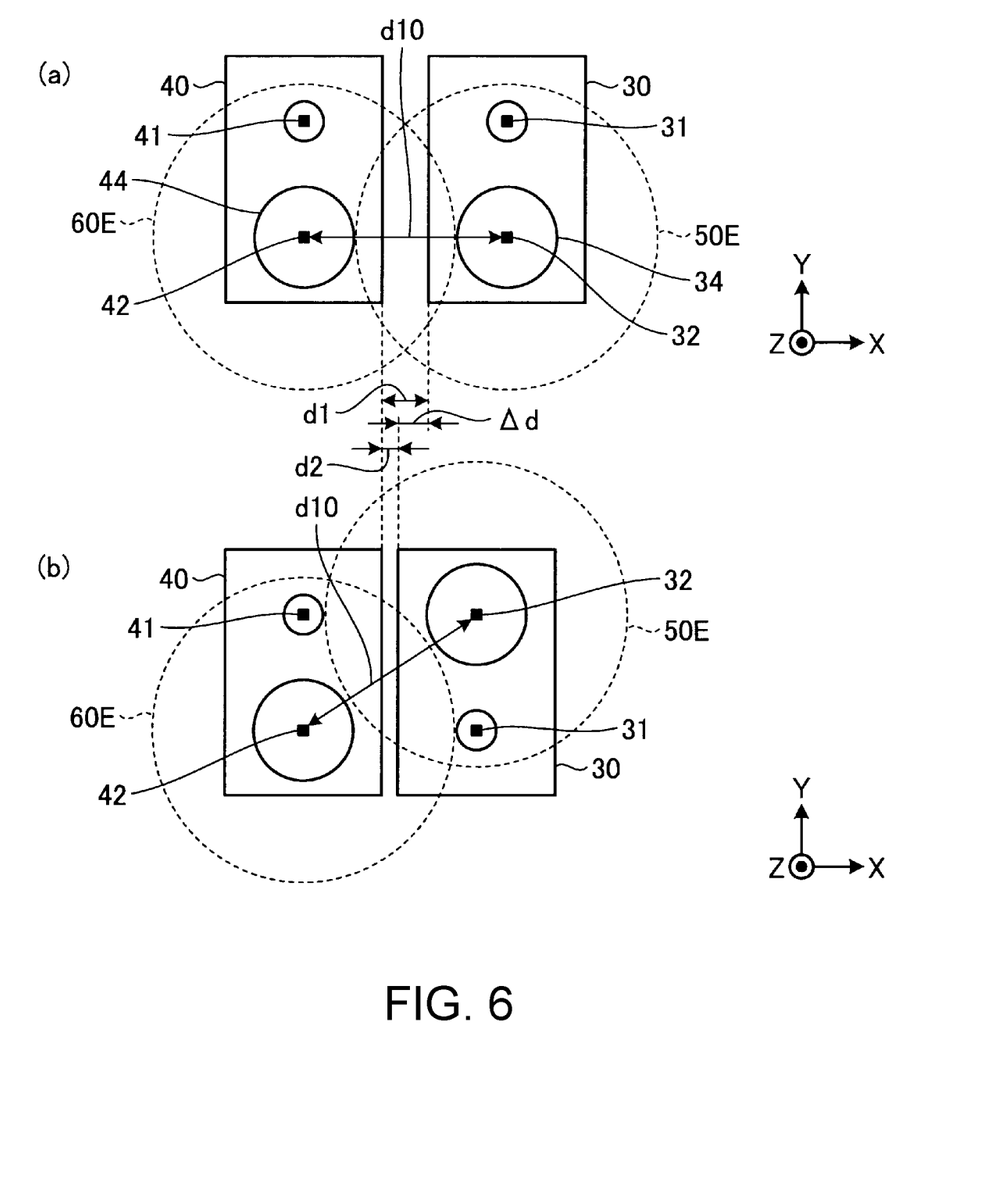
FIG. 6 shows positional relationships between optical transmitters and optical receivers in optical transceivers placed adjacent to each other according to a prior art and an embodiment of the present invention.

When the optical transceivers 30, 40 are placed adjacent to each other, the optical transmitter 31 and the optical receiver 32 conventionally have, as shown in FIG. 6(*a*), the same positional relationship with respect to the Y direction as that of the optical transmitter 41 and the optical receiver 42. Here, although the optical transmitter 61 opposing to the optical receiver 42 emits the light beam as a parallel light, the light beam spreads according to Gaussian distribution. As the spread light interferes with the adjacent optical receiver 32 in a light region 60E, the optical transceivers 30, 40 need to be placed adjacent to each other in such a manner that the light region 60E does not overlap with the condenser lens 34. Also, the optical transceivers 30, 40 need to be placed adjacent to each other in such a manner that a light region 50E, in which the light from the optical transmitter 51 interferes with the optical receiver 42, does not overlap with the condenser lens 44. Therefore, it is required that the optical transceivers 30, 40 are spaced apart from each other by a distance d1 in the X direction.

Meanwhile, according to the present embodiment as shown in FIG. 6(*b*), the optical transmitter 31 and the optical receiver 32 in the optical transceiver 30 has an opposite positional relationship with respect to the Y direction (first direction) to that of the optical transmitter 41 and the optical receiver 42 in the optical transceiver 40. With this arrangement, when the optical transceivers 30, 40 are placed apart by the distance d1, a distance d10 between the optical receivers 32 and 42 in FIG. 6(*b*) is greater than the distance d10 between the optical receivers 32 and 42 in FIG. 6(*a*). Accordingly, the distance between the optical receivers 32 and 42 is reduced to d10, which allows the distance between the optical transceivers 30 and 40 to be as small as d2, as shown in FIG. 6(*b*). With the distance d2, the optical transceivers 30, 40 are placed closer to each other than the distance d1 by a distance ?d. As a result, the present embodiment allows a reduced installation space compared to the prior art when a plurality of optical transceivers 30, 40 are placed adjacent to each other. That is, in the optical transceiver 30 as the first unit and the optical transceiver 40 as the second unit that are placed adjacent to each other, the optical transmitters 31, 41 and the optical receivers 32, 42 are respectively arranged in such a manner that an electromagnetic wave transmitted from the optical transmitter 51 opposing to the optical receiver 32 of one unit (e.g., the first unit) interferes with the optical transmitter 41 of the other unit (e.g., the second unit) but does not interfere with the optical receiver 42 of the other unit.

When each of a set of optical transceivers 30, 50 and a set of optical transceivers 40, 60 performs a full-duplex communication at a transmission rate of 20 Gbps, for example, a full-duplex communication at a transmission rate of 40 Gbps is possible.

Instead of the power connector 29, the hook 28 and the hook receiving part 18 may be used in combination as a power connector. In that case, the optical transceivers 50, 60 of the optical transceiver section 26 opposing to the optical transceiver section 16 can only be replaced by inverted optical transceivers 30, 40, which allows an easy manufacturing.

III. First Modification

Figure 7:
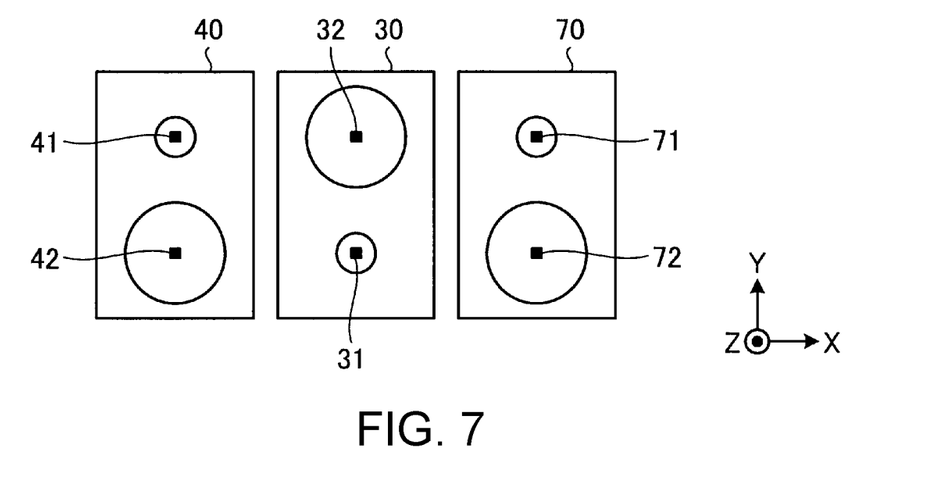
FIG. 7 shows an adjacent positional relationship of optical transceivers according to a first modification of the embodiment.

FIG. 7 shows an adjacent positional relationship of optical transceivers according to a first modification of the embodiment. In this first modification, further to the optical transceivers 30, 40 that are placed adjacent to each other as shown in FIG. 5, an additional optical transceiver 70 is placed adjacently in the X direction (second direction). In the additional optical transceiver 70 placed adjacently in the +X direction, a positional relationship between the optical transmitter 71 and the optical receiver 72 is opposite, in the Y direction, to that of the optical transmitter 31 and the optical receiver 32 in the immediately adjacent optical transceiver 30. That is, in the optical transceiver 70, the optical receiver 72 and the optical transmitter 71 are arranged in this order at a predetermined interval in the first direction (+Y direction), just like in the optical transceiver 40 as the second unit. Thus, a plurality of transceivers are placed in such a manner that they are adjacent to each other in a direction perpendicular to a line between a transmitter and a receiver forming a pair and that the transmitters and the receivers are alternately arranged with each other. This allows a reduced installation space even when three or more optical transceivers are placed adjacent to each other.

When each of the optical transceivers 40, 30 and 70 performs a full-duplex communication with an optical transceiver opposing thereto at a transmission rate of 20 Gbps, for example, a full-duplex communication at a transmission rate of 60 Gbps is possible.

IV. Second Modification

Figure 8:
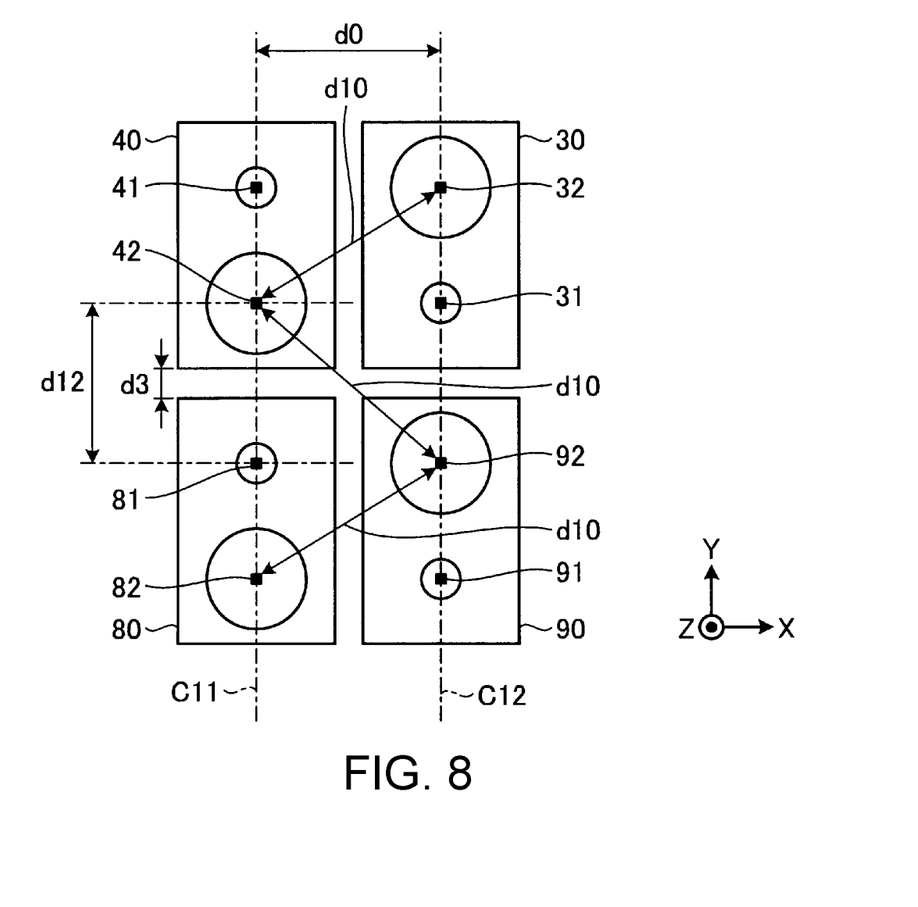
FIG. 8 shows an adjacent positional relationship of optical transceivers according to a second modification of the embodiment.

FIG. 8 shows an adjacent positional relationship of optical transceivers according to a second modification of the embodiment. In this second modification, further to the optical transceivers 30, 40 that are placed adjacent to each other as shown in FIG. 5, additional optical transceivers 80, 90 are placed adjacently in the −Y direction (first direction). That is, the optical transceiver 80 is placed adjacent to the optical transceiver 40 in the −Y direction. In the optical transceiver 80, the positional relationship between an optical transmitter 81 and an optical receiver 82 is same as that between the optical transmitter 41 and the optical receiver 42 in the optical transceiver 40. The optical transmitter 81 and the optical receiver 82 in the optical transmitter 80 and the optical transmitter 41 and the optical receiver 42 in the optical transceiver 40 are located on a same line C11. Likewise, the optical transceiver 90 is placed adjacent to the optical transceiver 30 in the −Y direction. In the optical transceiver 90, the positional relationship between an optical transmitter 91 and an optical receiver 92 is same as that between the optical transmitter 31 and the optical receiver 32 in the optical transceiver 30. The optical transmitter 91 and the optical receiver 92 in the optical transmitter 90 and the optical transmitter 31 and the optical receiver 32 in the optical transceiver 30 are located on a same line C12.

Here, the optical transceivers 30, 40 and the optical transceivers 80, 90 are spaced apart by a distance d3 which is a minimum possible distance therebetween when the distance between the optical receiver 42 and the optical receiver 92 is equal to or greater than the distance d10.

This allows a reduced installation space even when three or more optical transceivers are placed adjacent to each other. Particularly, in the second modification, it is possible to reduce the installation space even though the optical transceivers are placed not only in the X direction but also in the Y direction.

When each of the optical transceivers 40, 30, 80 and 90 performs a full-duplex communication with an optical transceiver opposing thereto at a transmission rate of 20 Gbps, a full-duplex communication at a transmission rate of 80 Gbps is possible.

In the above embodiments and modifications, a light is used as a medium. However, a radio wave having high directivity such as a microwave or a millimeter wave may also be used as a medium. For example, the medium can be used by opposing transceivers in a horn antenna. In other words, the embodiments and modifications of the present invention may use an electromagnetic wave having high directivity including a light and radio wave as a medium.

The structures of the foregoing embodiments and modifications are merely schematically shown in terms of functions, and do not need to be physically configured as depicted in the drawings. That is, the form in which the apparatuses and components are separated or integrated is not limited to those depicted in the drawings, and all or part thereof can be functionally or physically separated or integrated in arbitrary units depending on various usage conditions and the like.

As has been described, the present invention provides an electronic apparatus that allows a reduced installation space even when multiple transceivers are placed adjacent to each other in the electronic apparatus and an extension device.

While the invention has been particularly shown and described with reference to a preferred embodiment, it will be understood by those skilled in the art that various changes in form and detail may be made therein without departing from the spirit and scope of the invention.

What is claimed is:

1. A transceiver, comprising:
   a first unit provides a full-duplex communication using an electromagnetic wave, wherein said first unit includes a transmitter and a receiver arranged in a transmitter-receiver order at a predetermined interval in a first direction; and
   a second unit provides a full-duplex communication using said electromagnetic wave, wherein said second unit includes a receiver and a transmitter arranged in a receiver-transmitter order at a predetermined interval in said first direction, wherein said second unit is placed adjacent to said first unit in a second direction perpendicular to said first direction, wherein, in said first unit and said second unit that are adjacent to each other, said transmitters and said receivers are respectively arranged in such a manner that an electromagnetic wave transmitted from a transmitter opposing to said receiver of one of said first and second units interferes with said transmitter of said other unit but does not interfere with said receiver of said other unit.

2. The transceiver of claim 1, further comprising at least one additional first unit and at least one additional second unit, wherein said first units and said second units are alternately and adjacently placed in said second direction.

3. The transceiver of claim 1, further comprising at least one additional first unit and at least one additional second unit, wherein said at least one additional first unit and said at least one additional second unit are respectively placed adjacent to said first unit and said second unit in said first direction.

4. The transceiver of claim 1, wherein said electromagnetic wave is an infrared light.

5. An electronic apparatus, comprising:
   a first chassis; and
   a second chassis rotatably connected to said first chassis, wherein said second chassis includes
     a first unit provides a full-duplex communication using said electromagnetic wave, wherein said first unit includes a transmitter and a receiver arranged in a transmitter-receiver order at a predetermined interval in a first direction; and
     a second unit provides a full-duplex communication using an electromagnetic wave, wherein said second unit includes a receiver and a transmitter arranged in a receiver-transmitter order at a predetermined interval in said first direction, wherein said second unit is placed adjacent to said first unit in a second direction perpendicular to said first direction,
   wherein, in said first unit and said second unit that are adjacent to each other, said transmitters and said receivers are respectively arranged in such a manner that an electromagnetic wave transmitted from a transmitter opposing to said receiver of one of said first and second units interferes with said transmitter of said other unit but does not interfere with said receiver of said other unit.

6. The electronic apparatus of claim 5, further comprising at least one additional first unit and at least one additional second unit, wherein said first units and said second units are alternately and adjacently placed in said second direction.

7. The electronic apparatus of claim 5, further comprising at least one additional first unit and at least one additional second unit, wherein said at least one additional first unit and said at least one additional second unit are respectively placed adjacent to said first unit and said second unit in said first direction.

8. The electronic apparatus of claim 5, wherein said electromagnetic wave is an infrared light.

* * * * *